United States Patent
Anselmo et al.

(10) Patent No.: US 9,619,887 B2
(45) Date of Patent: Apr. 11, 2017

(54) METHOD AND DEVICE FOR VIDEO-SIGNAL PROCESSING, TRANSMITTER, CORRESPONDING COMPUTER PROGRAM PRODUCT

(75) Inventors: Tea Anselmo, Bibiana (IT); Daniele Alfonso, Magenta (IT); Diego Andres Angulo Pabon, Bogota (CO)

(73) Assignee: STMicroelectronics S.r.l., Agrate Brianza (IT)

( * ) Notice: Subject to any disclaimer, the term of this patent is extended or adjusted under 35 U.S.C. 154(b) by 1095 days.

(21) Appl. No.: 13/235,099

(22) Filed: Sep. 16, 2011

(65) Prior Publication Data

US 2012/0069897 A1  Mar. 22, 2012

(30) Foreign Application Priority Data

Sep. 17, 2010  (IT) .................. TO10A0763

(51) Int. Cl.
*H04B 1/66* (2006.01)
*G06T 7/00* (2017.01)
(Continued)

(52) U.S. Cl.
CPC ........ *G06T 7/0081* (2013.01); *G06K 9/00261* (2013.01); *H04N 19/124* (2014.11); *H04N 19/137* (2014.11); *H04N 19/14* (2014.11); *H04N 19/17* (2014.11); *H04N 19/59* (2014.11); *H04N 19/80* (2014.11); *H04N 19/85* (2014.11);
(Continued)

(58) Field of Classification Search
None
See application file for complete search history.

(56) References Cited

U.S. PATENT DOCUMENTS 6,343,141 B1  1/2002  Okada et al.
6,360,003 B1 *  3/2002  Doi et al. ............. 382/107
(Continued)

FOREIGN PATENT DOCUMENTS

EP  0 537 958 A2  4/1993

OTHER PUBLICATIONS

Cheng et al., "Automatic Video Region-of-Interest Determination Based on User Attention Model," Proceedings of the IEEE International Symposium on Circuits and Systems (ISCAS), IEEE, Kobe, Japan, May 23-26, 2005, pp. 3219-3222.
(Continued)

*Primary Examiner* — Tat Chio
(74) *Attorney, Agent, or Firm* — Seed IP Law Group LLP (57) ABSTRACT

A motion analysis is applied to a signal to identify high-motion regions and low-motion regions. An analysis of low-level characteristics of the signal, such as a skin tone or contrast analysis, is used to generate a map of regions with low-level characteristics. The map is filtered to identify regions having both low-level characteristics and low motion. Based on a comparison of the area of the regions having both low-level characteristics and low motion to a threshold, regions of interest are identified. If the area is greater than the threshold, the regions of interest are identified as a function of the high-motion regions and of the regions that have both low-level characteristics and low motion. Otherwise, the regions of interest are identified as a function of the high-motion regions and of regions identified using face detection.

25 Claims, 6 Drawing Sheets

(51) Int. Cl.
*H04N 19/124* (2014.01)
*H04N 19/14* (2014.01)
*H04N 19/137* (2014.01)
*H04N 19/17* (2014.01)
*H04N 19/80* (2014.01)
*H04N 19/85* (2014.01)
*H04N 19/59* (2014.01)
*G06K 9/00* (2006.01)

(52) U.S. Cl.
CPC .............. *G06T 2207/10016* (2013.01); *G06T 2207/30201* (2013.01)

(56) References Cited

U.S. PATENT DOCUMENTS

| | | |
|---|---|---|
| 2006/0215752 A1 | 9/2006 | Lee et al. |
| 2006/0215753 A1 | 9/2006 | Lee et al. |
| 2006/0285724 A1* | 12/2006 | Tian .............................. 382/103 |
| 2007/0025444 A1* | 2/2007 | Okada et al. ............ 375/240.16 |
| 2007/0076957 A1 | 4/2007 | Wang et al. |
| 2007/0183661 A1* | 8/2007 | El-Maleh et al. ............ 382/173 |

OTHER PUBLICATIONS

Liu et al., "Region-of-Interest Based Resource Allocation for Conversational Video Communication of H.264/AVC," IEEE Transactions on Circuits and Systems for Video Technology 18(1): 134-139, Jan. 1, 2008.

Chen, Q., et al. "Application of Scalable Visual Sensitivity Profile in Image and Video Coding," IEEE International Symposium on Circuits and Systems, Jun. 2008, Seattle, WA, 4 pages.

Menser, B., et al. "Face Detection and Tracking for Video Coding Applications," IEEE Conference on Signals, Systems and Computers, Oct.-Nov. 2000, Pacific Grove, CA, 5 pages.

* cited by examiner

METHOD AND DEVICE FOR VIDEO-SIGNAL PROCESSING, TRANSMITTER, CORRESPONDING COMPUTER PROGRAM PRODUCT

BACKGROUND

Technical Field

The present description relates to techniques for processing of image signals (video signals). The present description has been developed with particular attention paid to the possible application to region-of-interest (ROI) detection, for example in applications of the type commonly referred to as "teleconference" or "telepresence".

Description of the Related Art

Videoconference (or telepresence) is a technology of communication that enables communications between users located in positions that are remote from one another via a communication network.

In a typical system of this sort, each user has available a display, a video camera (such as, for example, a webcam), a microphone and an Internet connection, and the users are hence set in a condition where they can see and hear each other in real time, with the possibility of conducting a natural conversation with modalities of interaction that are not easy to achieve with voice-only communication technologies.

The corresponding advantages are appreciated to an increasing extent both in applications of a professional and working nature and in personal and private use with recourse to videoconference software such as Skype, Google Talk, Wengo, etc.

In the diffusion of telepresence technologies, in addition to commercial factors (market awareness) and to the definition of increasingly wide-range criteria of interoperability, a significant factor is the video quality, the latter being a factor that, in addition to the available bandwidth and the quality offered by the reproduction tools, depends upon the video resolution of the camera used and of the corresponding codec.

In addition to the efforts aimed at increasing in any case the bandwidth available for transmission, increasing attention is paid to the coding techniques, such as techniques based upon the visual-attention model (VAM), i.e., a formalization of how the human visual system (HVS) is able to distinguish objects that attract the eye and that thus acquire importance as compared to elements of lower attraction/interest.

The literature illustrates various techniques that facilitate combination of the information on colors, shapes, and motion to give rise to various VAMs so as to reproduce the visual attention of human observers. For a general review of these techniques reference may be made, for example, to documents such as:

B. Menser, M. Brunig, "Face Detection and Tracking for Video Coding Applications", IEEE Conference on SSC, October-November 2000, Pacific Grove, Calif.;

Q. Chen et al., "Application of Scalable Visual Sensitivity Profile in Image and Video Coding", ISCAS 2008, June 2008, Seattle, Wash.

U.S. Patent Publication No. 2007/0076957 (entitled "Video Frame Motion-Based Automatic Region-Of-Interest Detection") describes processing techniques for identification of regions of interest (ROIs) that are based, for example, on statistical data regarding a video signal and on processing information, at the video-camera end, so as to generate a map of the skin tones (skin map). This document describes also a technique of ROI detection with the use of motion information obtained during motion estimation in video processing so as to identify regions of interest. For the purposes of video communication, the regions of greater interest are identified with the faces so that the method described applies a face detector on the areas identified via information on the skin or information of motion, obtained independently, or via a combination of both. The choice of an adaptive type between factors linked to the presence of skin, motion, or both is correlated to considerations of homogeneity and of quality of the skin map (so-called intra-mode ROI detection) and to changes of the complexity of the motion (inter-mode skin detection).

Further documents, such as US Patent Publication No. 2006/0215752 (entitled "Region-Of-Interest Extraction for Video Telephony") and US Patent Publication No. 2006/0215753 (entitled "Region-Of-Interest Processing for Video-Telephony"), describe, with reference to video-telephony applications, solutions in which the transmission and reception devices are equipped so as to be able to act in a symmetrical way both as transmitter and as receiver of video information. During operation as receiver, each device can define far-end information of a ROI type for the video signal encoded by the device when the latter operates as transmitter. During operation as transmitter, each device can define near-end ROI information for the video information transmitted to the other device that functions as receiver. The devices in question can hence be considered as "ROI-aware" in the sense that each of them is able to carry out processing, starting from the ROI information supplied by the other device, so as to be able to support a far-end control of the video coding on the basis of information of a ROI type. This solution can operate either on pre-defined configurations (for example, rectangular portions of image with different dimensions) or else on the basis of verbal, graphic, or text descriptions supplied by the remote user or via an automatic identification of a ROI type, for example based upon traditional schemes of face identification.

U.S. Pat. No. 6,343,141 B1 (entitled "Skin Area Detection for Video Image Systems") proposes use of a skin detector to identify skin areas in video sequences to be used for a function of video coding/decoding. The detector identifies the regions of interest in the video frame by initially analyzing the shape of all the objects in a video sequence so as to locate one or more objects that could contain skin areas (for example, it is possible to exploit the fact that the faces have an approximately elliptical shape, causing the system to search objects of an elliptical shape). The detector then examines the pixels of the objects located to determine whether these present colorimetric characteristics typical of skin areas. The detector then compares the skin tones thus identified with tones of the entire frame so as to determine other possible regions with skin tones.

BRIEF SUMMARY

Some drawbacks of the solutions described previously include, for example:

the risk of not identifying, following upon undesirable thresholding effects used for the adaptive selection of the regions in which skin tones and areas of motion are present, objects that move rapidly and "new" objects that enter the scene framed;

the possible need to use, in addition to information of a near-end type, also information of a far-end type with the consequent increase in terms of communication overheads and/or the possible need to use a fixed pattern; and the risk of a combined action of detection of the shapes and of the skin tones not giving rise to the desired results because there exist regions with skin tones not detected with the action of detection of the shapes or else that have a different tone with respect to other detected objects. An embodiment reduces these risks and the likelihood that information of a far-end type will be needed to maintain acceptable quality.

Embodiments comprise methods, corresponding systems, as well as a computer program products that can be loaded into the memory of at least one computer and comprises portions of software code that are able to implement steps of a method when the product is run on at least one computer. As used herein, the reference to such a computer program product is understood as including a computer-readable medium containing instructions for controlling a processing system to co-ordinate implementation of a method. Reference to "at least one computer" is evidently meant to highlight the possibility of an embodiment being implemented in a modular and/or distributed form.

In various embodiments, the identification of the regions of interest (ROIs) takes place by taking into account both the information of motion and the information on the skin tones.

In various embodiments, it is envisaged to detect both high motion and low motion so as to be able to capture with a high likelihood all the changes and events of motion in the video frame analyzed.

In various embodiments, the regions of interest are selected in an automatic way at a local level on the basis of information of a near-end type.

In various embodiments, the regions of interest are selected frame by frame with a granularity at a block (macroblock) level.

In various embodiments, recourse to fixed configurations or patterns may be avoided, which facilitates taking into account any shape, which in turn facilitates more precise definition of the contours of the regions of interest.

In various embodiments, the function of detection of the skin tones can be rendered very simple, and approximated, for example, via linear functions applied to the entire image so as to identify the possible regions of skin and then refine this information with information of motion.

In various embodiments, it is possible to achieve a high level of flexibility without setting limitations on the identification of the shapes, said operation being on the other hand extremely complex and burdensome in computational terms if applied to an entire image.

In various embodiments, the identification of the regions of interest in each image is carried out in a precise and efficient way so as to enable a video encoder operating in a scenario with low bitrate to modulate the compression factor for each coding unit (for example, a 16×16 macroblock), according to the degree of "saliency" of the coding unit itself.

In various embodiments, designed for example for applications of videoconference and telepresence, both a mechanism of detection of the skin tones and an analysis of the content of the motion are applied so as to generate a map of the regions of interest to which a high degree of saliency is associated.

In various embodiments, taking in account the fact that the detection of the motion supplied by the encoder may not be sufficiently precise to detect changes of content, an analysis pixel by pixel may be carried out of the differences between successive frames (not necessarily adjacent ones) then applying morphological operators to reconstructed coherent-motion regions.

In various embodiments, the map of the regions of interest may be converted into a quantization map supplied to an encoder in order to improve the quality of reproduction of said regions identified as salient.

In an embodiment, a method of detecting regions of interest in a video signal includes subjecting said video signal to motion analysis to identify in said video signal fast motion regions and slow motion regions, subjecting said video signal to analysis of low level characteristics including at least one characteristic out of contrast and skin tones, by generating a corresponding map of low level characteristic regions, filtering said map of low level characteristic regions as a function of the regions identified as slow motion regions in said motion analysis, by identifying the regions in said video signal exhibiting both low level characteristics and slow motion, checking if the surface of said regions exhibiting both low level characteristics and slow motion represent a portion of image higher or lower than a given threshold, and a) if said portion is higher than said given threshold, identifying said regions of interest as a function of the fast motion regions and the regions exhibiting both low level characteristics and low motion, or b) if said portion is lower than said given threshold, subjecting said video signal to face detection, by identifying said regions of interest as a function of the fast motion regions and the regions identified by means of said face detection. In an embodiment, identifying said regions of interest includes: a) if said portion is higher than said given threshold, identifying said regions of interest as the sum of said fast motion regions and the regions exhibiting both low level characteristics and low motion, or b) if said portion is lower than said given threshold, identifying said regions of interest as the sum of said fast motion regions and the regions identified via said face detection. In an embodiment, said analysis of low level characteristics includes at least one of: intensity contrast analysis, skin tone detection, color contrast analysis, and directional contrast analysis. In an embodiment, said face detection includes checking if a previously obtained face map is available, and in the presence of said map face previously obtained, retrieving said face map, and in the absence of said face map previously obtained, generating a new face map. In an embodiment, the method includes identifying said regions of interest as regions ordered according to saliency order, established for instance via thresholding. In an embodiment, the method includes subjecting to said video signal to sub-sampling for said motion analysis. In an embodiment, said motion analysis includes at least one of: thresholding said video signal with respect to an average intensity value to avoid effects of lighting changes, and identifying the contours of the regions in motion by discarding those regions having a perimeter lower than a given value and/or merging adjacent regions.

In an embodiment, a device for identifying regions of interest in a video signal is configured to perform an embodiment of a method as disclosed herein. In an embodiment, a system includes the device and an encoder configured for subjecting said video signal to encoding with at least two different quantization step values, higher and lower respectively, wherein said device is coupled to said encoder to control said encoder and apply to the regions of the video signal identified by the device as a region of interest a quantization step lower than at least one quantization step applied to the other regions of said video signal. In an embodiment, the system comprises a transmitter for a video conference or telepresence system. In an embodiment, a computer program product, loadable in the memory of at least one computer, includes software code portions to implement the steps of an embodiment of a method as described herein.

In an embodiment, a method comprises: identifying regions of interest in a video signal, by, identifying fast motion regions; identifying slow motion regions having low-level characteristics; comparing an area of the identified slow motion regions having low-level characteristics to a threshold area; when the area of the identified slow motion regions having low-level characteristics is larger than the threshold area, identifying regions of interest as a function of the fast motion regions and the slow motion regions having low-level characteristics; and when the area of identified slow motion regions having low-level characteristics is smaller than the threshold area, identifying face regions; and identifying regions of interest as a function of the fast motion regions and the face regions. In an embodiment, the identifying the slow motion regions having low-level characteristics comprises: identifying slow motion regions; analyzing at least one of a contrast characteristic and a skin tone characteristic; generating a map of low-level characteristic regions based on the analysis of at least one of a contrast characteristic and a skin tone characteristic; and filtering said map of low-level characteristic regions as a function of the identified slow motion regions. In an embodiment, the method includes, when the area of the identified slow motion regions having low-level characteristics is larger than the threshold area, identifying the regions of interest as a sum of said fast motion regions and the slow motion regions having low level characteristics; and when the area of the identified slow motion regions having low-level characteristics is smaller than said threshold area, identifying the regions of interest as a sum of said fast motion regions and the face regions. In an embodiment, analyzing at least one of a contrast characteristic and a skin tone characteristic includes at least one of: an intensity contrast analysis; a skin tone detection; a color contrast analysis; and a directional contrast analysis. In an embodiment, the identifying face regions includes: determining whether a previously obtained face map is available; when the previously obtained face map is available, retrieving said face map; and when the previously obtained face map is unavailable, generating a new face map. In an embodiment, the method further comprises ordering at least some of said regions of interest according to saliency order. In an embodiment, the method comprises establishing saliency order via thresholding. In an embodiment, the identifying fast motion regions and the identifying slow motion regions having low-level characteristics includes sub-sampling said video signal. In an embodiment, the identifying fast motion regions and the identifying slow motion regions having low-level characteristics includes at least one of: thresholding said video signal with respect to an average intensity value; identifying contours of regions in motion by discarding those regions having a perimeter lower than a threshold perimeter; and identifying contours of regions in motion by merging adjacent regions. In an embodiment, the method further comprises: encoding the video signal with at least two different quantization step values, by: applying to the identified regions of interest a quantization step lower than at least one quantization step applied to other regions of said video signal. In an embodiment, the threshold area is a threshold portion of a total area of the video signal.

In an embodiment, a non-transitory computer-readable medium's contents cause a processing device to perform a method, the method comprising: identifying regions of interest in a video signal, by, identifying fast motion regions; identifying slow motion regions having low-level characteristics; comparing an area of the identified slow motion regions having low-level characteristics to a threshold area; when the area of the identified slow motion regions having low-level characteristics is larger than the threshold area, identifying regions of interest as a function of the fast motion regions and the slow motion regions having low-level characteristics; and when the area of identified slow motion regions having low-level characteristics is smaller than the threshold area, identifying face regions; and identifying regions of interest as a function of the fast motion regions and the face regions. In an embodiment, the identifying the slow motion regions having low-level characteristics comprises: identifying slow motion regions; analyzing at least one of a contrast characteristic and a skin tone characteristic; generating a map of low-level characteristic regions based on the analysis of at least one of a contrast characteristic and a skin tone characteristic; and filtering said map of low-level characteristic regions as a function of the identified slow motion regions. In an embodiment, the method includes, when the area of the identified slow motion regions having low-level characteristics is larger than the threshold area, identifying the regions of interest as a sum of said fast motion regions and the slow motion regions having low level characteristics; and when the area of the identified slow motion regions having low-level characteristics is smaller than said threshold area, identifying the regions of interest as a sum of said fast motion regions and the face regions. In an embodiment, the method further comprises ordering at least some of said regions of interest according to saliency order. In an embodiment, the identifying fast motion regions and the identifying slow motion regions having low-level characteristics includes at least one of: thresholding said video signal with respect to an average intensity value; identifying contours of regions in motion by discarding those regions having a perimeter lower than a threshold perimeter; and identifying contours of regions in motion by merging adjacent regions.

In an embodiment, a device comprises: a face region identifier configured to identify face regions in a video signal; a motion region detector configured to identify fast motion regions and slow motion regions in the video signal; a low-level characteristics region identifier configured to identify regions with low-level characteristics based on at least one of a contrast analysis and a skin tone analysis; an area calculator configured to determine an area of slow motion regions having low-level characteristics; a comparator configured to compare the determined area to a threshold area; and a region of interest identifier configured to: when the determined area is larger than the threshold area, identify a set of regions of interest as a function of identified fast motion regions and identified slow motion regions having low level characteristics; and when the determined area is smaller than the threshold area, identify the set of regions of interest as a function of identified fast motion regions and identified face regions. In an embodiment, the region of interest identifier is configured to, when the determined area is larger than the threshold area, identifying the set of regions of interest as a sum of identified fast motion regions and identified slow motion regions having low level characteristics; and when the area is smaller than said threshold area, identifying the set of regions of interest as a sum of identified fast motion regions and identified face regions. In an embodiment, the low-level characteristics region identifier comprises at least one of: an intensity contrast analyzer;

a skin tone analyzer; a color contrast analyzer; and a directional contrast analyzer. In an embodiment, said face region identifier is configured to: determine whether a face map is available; when it is determined a face map is available, retrieve the face map; and when it is determined a face map is unavailable, generate a face map. In an embodiment, the region of interest identifier is configured to order the identified set of regions of interest according to saliency order. In an embodiment, the device further comprises an encoder configured to encode the video signal with at least two different quantization step values, by applying to the identified set of regions of interest a quantization step lower than at least one quantization step applied to other regions of said video signal. In an embodiment, the device further comprises a video signal source.

In an embodiment, a system comprises: means for identifying fast motion regions; means for identifying slow motion regions having low-level characteristics; means for identifying face regions; and means for identifying regions of interest in a video signal based on an area of identified slow motion regions having low-level characteristics. In an embodiment, the means for identifying regions of interest is configured to, when the area of identified slow motion regions having low-level characteristics is larger than a threshold area, identifying said regions of interest as a function of identified fast motion regions and identified slow motion regions having low-level characteristics; and when the area of identified slow motion regions having low-level characteristics is smaller than the threshold area, and identifying said regions of interest as a function of identified fast motion regions and identified face regions. In an embodiment, the means for identifying regions of interest is configured to, when the area of identified slow motion regions having low-level characteristics is larger than the threshold area, identifying said regions of interest as a sum of identified fast motion regions and identified slow motion regions having low-level characteristics; and when the area of identified slow motion regions having low-level characteristics is smaller than the threshold area, and identifying said regions of interest as a sum of identified fast motion regions and identified face regions. In an embodiment, the system further comprises: means for generating video signals; means for capturing video signals; and means for encoding captured video signals based on identified regions of interest.

BRIEF DESCRIPTION OF THE SEVERAL VIEWS OF THE DRAWINGS

Embodiments will now be described, purely by way of non-limiting example, with reference to the annexed drawings, wherein.

DETAILED DESCRIPTION

In the ensuing description various specific details are illustrated aimed at an in-depth understanding of the embodiments. The embodiments may be provided without one or more of the specific details, or with other methods components, materials, etc. In other cases, known structures, materials, or operations are not shown or described in detail so that various aspects of the embodiments will not be obscured.

Reference to "an embodiment" or "one embodiment" in the framework of this description indicates that a particular configuration, structure, or characteristic described in relation to the embodiment is comprised in at least one embodiment. Hence, phrases such as "in an embodiment" or "in one embodiment" that may be present in various points of this description do not necessarily refer to one and the same embodiment. In addition, particular conformations, structures, or characteristics may be combined in any adequate way in one or more embodiments.

The references used herein are only provided for convenience and hence do not define the sphere of protection or the scope of the embodiments.

Figure 1:
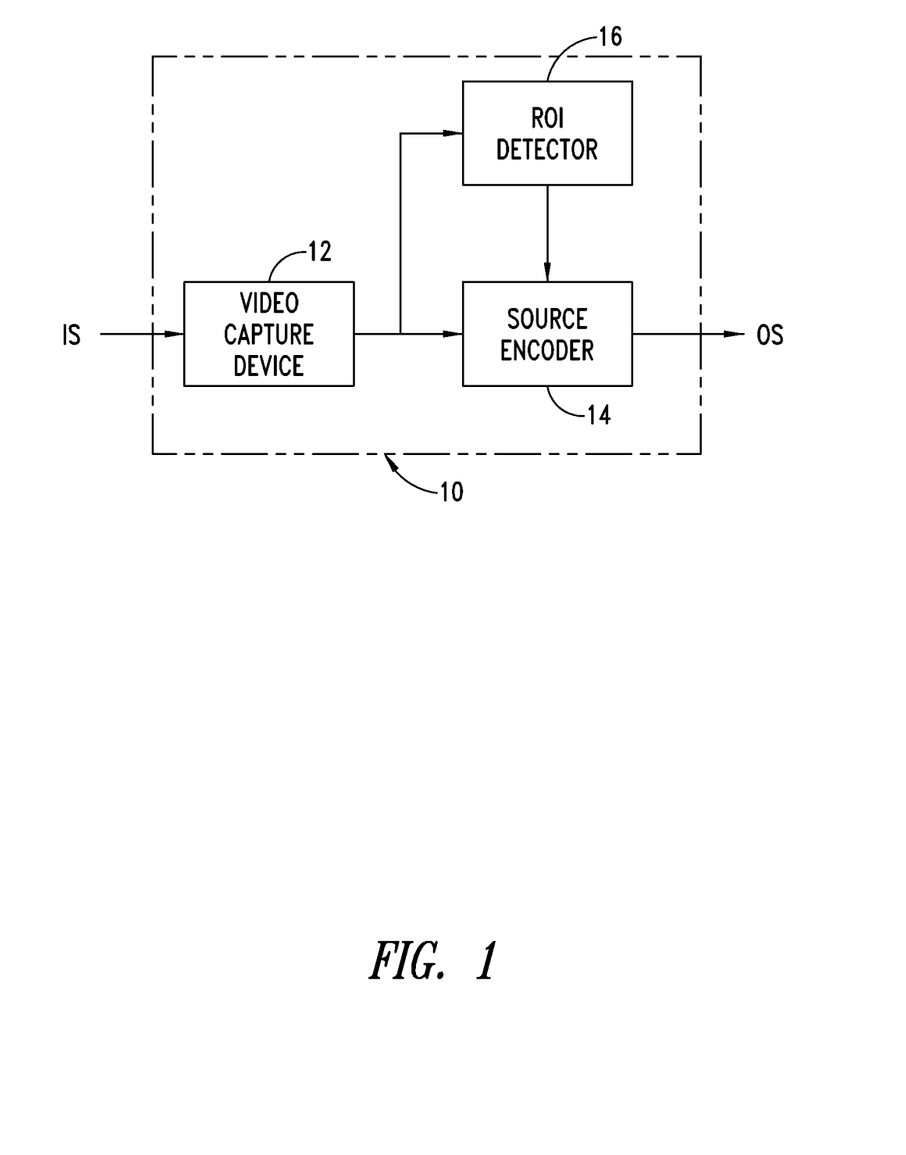
FIG. 1 is a block diagram of a transmitter with video coding, which incorporates an embodiment of a device for identification of the regions of interest (ROIs) as described herein.

In the diagram of FIG. 1 the reference number 10 designates as a whole a device for video coding designed to receive at input (from a source, not visible in the drawings) an input video signal IS.

In various embodiments, the source of the video signal can be a video camera of the webcam type.

Starting from the input signal IS, the device 10 generates an output video signal OS. In various embodiments, the output signal OS is a bitstream encoded at output that can be transmitted on a communication network, for example over the Internet, so that the device 10 is suited to being integrated in the transmitter of a videoconference or telepresence system.

In the example embodiment considered herein, the device 10 comprises:

a module 12 for capturing the video signal, which is configured to generate, starting from the input signal IS, a digital video signal organized in images/frames, for example according to the YUV 4:2:0 format;

a source encoder 14, which is configured to generate the output signal OS starting from the signal supplied by the module 12; and a region-of-interest (ROI) detector module 16, which is configured to receive the output signal of the module 12 and process it, for example according to the criteria described in what follows and to supply to the encoder 14 a quantization map designed to cause (for example operating according to criteria in themselves known and hence such as not to call for a detailed description herein) the encoder 14 to apply its resources in a differentiated way to the regions of interest (ROIs) so as to improve the quality of transmission, and hence of reception, of said regions of the video signal, other system parameters remaining the same.

In the technological scenario currently prevalent in Europe, even though an increasing number of users are served by symmetrical wide-band connections with an available bandwidth of 10 to 100 Mb/s both downstream and upstream, there exists up to now a considerable amount of ADSLs (Asymmetrical Digital Subscriber Lines) in which the available bandwidth upstream does not exceed the value of 1 Mb/s, or even lower values. In order to enable a high-definition (HD) video transmission with such a limitation of bandwidth, rather high compression factors are applied. In particular, the rate-control algorithms can apply a constant quantization step on an image-by-image basis so as to compress the video signal with a uniform level of quality, with the risk, however, of jeopardizing the subjective video quality to the point of rendering it unsatisfactory for the user.

Various embodiments enable, instead, variation of the compression factor within each image (or frame) so as to reserve bits (quality) for the regions of each image considered more interesting and important (ROIs) for the human visual system, tolerating a certain (controlled) deterioration of the quality in the regions considered of lower interest.

In various embodiments, the role of the detector module 16 is to supply to the encoder 14 the information (quantization map) such as to enable precisely the encoder 14 to identify the regions of interest (ROIs) to which the allocation of bits and band is to be preferentially reserved, according to the criteria described previously.

In various embodiments, the encoder 14 can be an encoder in compliance with the H.264/AVC video standard. Reference to this standard, and, accordingly, to a signal supplied to the encoder 14 in the YUV 4:2:0 format (which can be used by an H.264 encoder) is made purely by way of example.

Persons skilled in the art, in fact, will readily appreciate that various embodiments are able to operate on a digital video signal in a format different from the YUV 4:2:0 format and/or in association with an encoder 14 operating according to a video-coding standard different from the H.264 standard.

The fact of referring by way of example to the standard in question (which can be more precisely defined as ITU-T/MPEG H.264/AVC) is linked to the fact that at the moment it is a standard that is particularly widespread for videoconference systems that have the capability of supporting a real-time video coding/decoding with a format at least equal to 1280×720 pixels at 30 Hz.

It is emphasized that the present description describes possible embodiments that can be used to generate the quantization map. The criteria and modes with which the encoder 14 uses said quantization map for coding the signal arriving from the device 12 are to be deemed known (according to a wide range of possibilities of implementation) and hence such as not to call for a detailed description herein.

Figure 2:
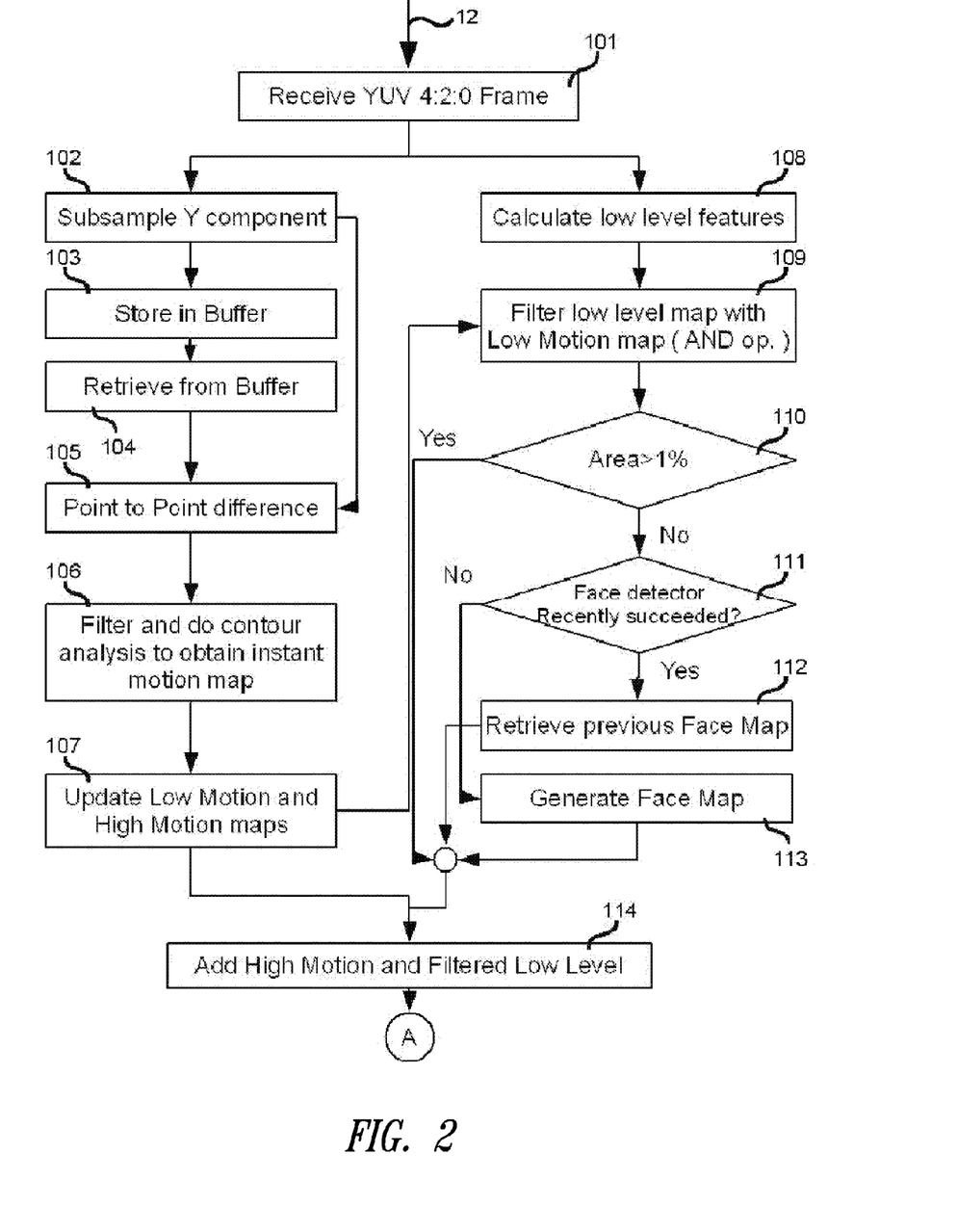
FIGS. 2 and 3 present a flowchart regarding an example embodiment.
Figure 3:
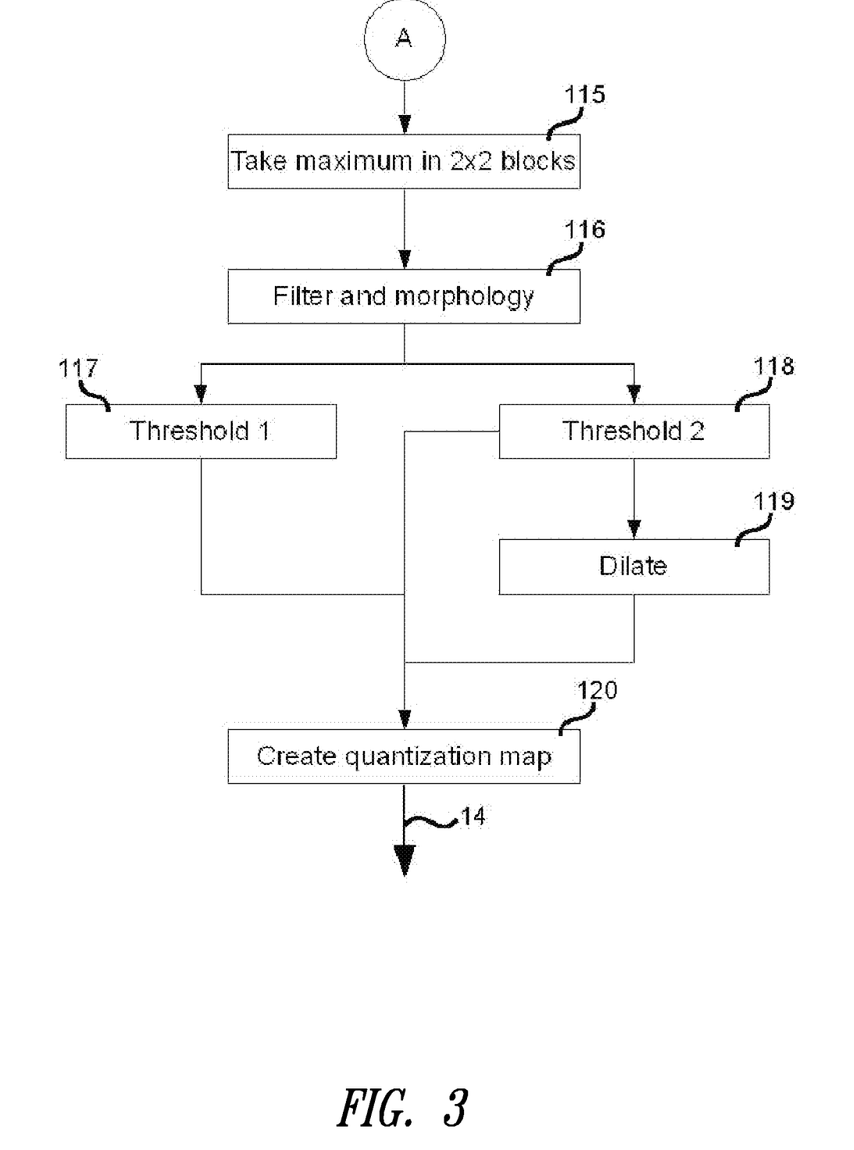

FIGS. 2 and 3 illustrate an embodiment of a method that may be employed, for example, by the embodiment of a device 10 illustrated in FIG. 1. For convenience, the method will be described with reference to the embodiment of FIG. 1 and to a YUV 4:2:0 frame. Other embodiments of devices and systems and other video frame standards may be employed. The flowchart represented in FIGS. 2 and 3 operates on the signal at output from the device 12, which is assumed as being received by the detector device 16 in a step designated by 101.

The example considered refers to a digital video signal organized in frames according to the YUV 4:2:0 format: it is again recalled that this is an example, which is not to be interpreted as in any way limiting the scope of the present description.

The portion of the flowchart represented in FIG. 2 presents various processing steps 102 to 107 and 108 to 113, implemented on the signal received in step 101 with a view of a combined treatment (logic sum or OR), implemented in a step 114, of the signals obtained, on the one hand, in steps 102 to 107 and, on the other hand, in steps 108 to 113.

The representation of FIG. 2 highlights the possibility, in various embodiments, of the processing steps in question being performed at least in part in parallel with respect to one another. The reference to this possibility is not, however, to be interpreted as in any way limiting the scope of the embodiments, an at least in part serial embodiment being possible.

Steps 102 to 106 refer to the implementation, on the signal received by the device 12, of a function of motion analysis and to the generation of a corresponding map.

The example embodiment illustrated herein regards the possibility of implementing said function of motion analysis in a simple way and with reduced processing burden.

The signal received in step 101 is first subjected, in a step 102, to a subsampling function (for example, of the component of intensity Y of the frame) in view of storage in a memory buffer (step 103). This procedure has the purpose of saving memory and reducing the associated time of access to the memory.

Step 105 corresponds to a function of analysis of the differences implemented point by point (pixel by pixel) between:
  the signal corresponding to a "previous" frame, retrieved in the memory or buffer in a step 104; and
  the signal corresponding to the "current" frame currently received in step 101 (in the exemplary embodiment illustrated herein, after prior subsampling in step 102).

In a possible example embodiment, if the buffer is not yet full, it is possible to use the oldest frame available, and, for the first frame, the map of the differences that is generated in step 105 can contain only zero values.

In a step 106, the map of the differences detected in step 105 is processed to obtain a map with information on the instantaneous motion in the frame.

In various embodiments, the corresponding processing can entail morphologic operations (dilate, open, close), followed by an analysis of the contours of the connected components.

Figure 4:
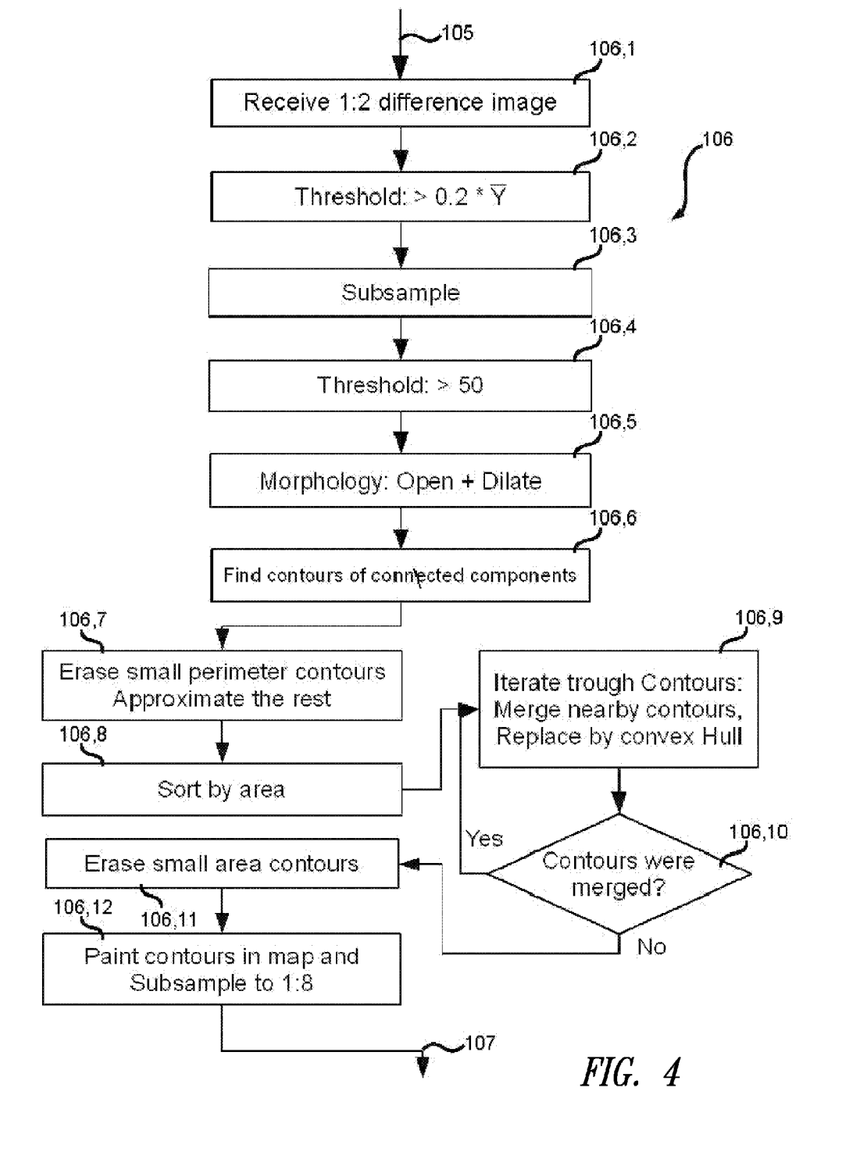
FIG. 4 is a flowchart that illustrates in greater detail the modes of implementation of an example embodiment of one of the steps of the flowchart of FIGS. 2 and 3.

The flowchart of FIG. 4 illustrates in greater detail a possible example embodiment of step 106.

In particular, on the signal representing the "difference" images, received in a step 106.1 starting from step 105, in a step 106.2 a threshold is applied, which depends upon the average intensity of the frame (for example, a threshold equal to 0.2*<Y> where <Y> indicates the average intensity of the frame), for example so as to reject changes due to variations of lighting.

In a step 106.3, the map thus obtained is then subsampled, for example by a factor 1:4 after application of a filter thereto, for example a Gaussian filter.

In a subsequent step 106.4 a second threshold of absolute value for example greater than 50 is then applied so as to obtain a binary map to enable identification of the contours of the connected components. This occurs after prior possible application of a function of morphology of the open+dilate type (step 106.5) in a step 106.6.

In various embodiments, to simplify the calculations, in a step 106.7 a function of rejection/erasure of the contours having a small perimeter is implemented, with possible approximation of the remaining contours via polygons.

In a step 106.8 the contours/polygons are then ordered according to their area to implement an iterative process on the list of the contours. This iterative process envisages that, if two contours are sufficiently close (on the basis of a threshold that depends upon the dimensions of the smallest contour) they same are merged into a single contour, the purpose of this operations being to retrieve of the convex hull of the new contour, which is replaced in the list instead of the original contours.

This set of operations, indicated in FIG. 4 by step 106.9 is inserted in an iterative cycle that comprises a decision step 106.10 designed to verify whether there are still possible changes to be made in the list (i.e., whether there are still contours to be merged with one another). The resulting polygons are subjected, after a prior possible further operation of erasure of the contours of small area, implemented in a step 106.11, in a step 106.12 to an operation of filling of the surface included in the polygons in a map 1:4 that is subjected to subsampling (for example, 1:8), and the results are returned in step 107 of FIG. 2.

It is once again recalled that the flowchart of FIG. 4 represents only a possible exemplary embodiment of step 106. It is likewise to be considered that, as already said, the set of the operations of motion analysis represented herein by steps 102 to 106 could be performed, in various embodiments, according to different criteria, known in the art.

Step 107 of FIG. 2 corresponds to application, to the map of the instantaneous motion, of two different temporal filters.

The first filter has the function of creating a low-motion map. In various embodiments, it presents a slow decay and can hence saturate with relative ease. This filter is initialized at a level such that, if motion is not detected, said level is equal to zero when the corresponding buffer is filled.

The second filter is designed to generate a map of high motion. In various embodiments, it presents a fast decay and hence does not tend to saturate. In various embodiments, it is a low-pass filter designed to filter the noise and to eliminate motion that occurs in isolated frames for example on account of vibrations of the webcam, flashes or fast changes of lighting.

In various embodiments, the first filter (low motion) can correspond to an expression of the type $$y[n]=y[n-1]+x[n]/2-k$$

where the parameter k can have for example a value of 128/30, which means that the motion detected is a motion designed to remain in the filter for 30 successive frames.

In various embodiments, the second filter (high motion) can correspond to an expression of the type $$z[n]=(to-1)/a*z[n-1]+x[n]/to$$

where the parameter a indicates the inertia of the filter.

In both preceding formulas, x[n] is the filter input (i.e. the instant motion map coming from block 106 in FIG. 2), while y[n] and z[n] are the filter outputs. In various embodiments, the filter structures may be recursive (i.e. may use feedback from outputs y[n] and z[n], respectively). The variable "n" denotes the time instant of the analyzed frame.

The choice of a value of "a" causes the filter to have a faster response, rendering it on the other hand more sensitive to noise, vibrations, and flashes.

Once again it is emphasized that what has been illustrated previously by way of example corresponds to just one of various modes to which it is possible to resort in order to subject the video signal IS captured via the module 12 to a motion analysis aimed at identifying high-motion regions and low-motion regions and generating respective maps of high-motion regions and low-motion regions.

In this connection it will be appreciated that the function performed by the two filters corresponding to the two expressions recalled previously is basically a thresholding function. Said thresholding function can be aimed at identifying the regions of the image/frame that move with a speed (e.g., mean or "centroidal" speed) that is higher and lower than respective given thresholds—which are possibly rendered variable/adjustable according to the application.

Considerations that are as a whole similar, as regards the possible solutions of implementation, apply for the modes to which it is possible to resort to provide the sequence of steps that appear on the right in FIG. 2.

This applies, for example, to step 108, which regards calculation of a combination of low-level characteristics.

In the technical literature, commonly indicated as "low level" characteristics are elements such as intensity, color, and orientation, that can be analyzed in order to identify portions of image or shapes with higher semantic content, such as edges, corners, blobs, patterns, and also skin and faces.

In various embodiments, the operation in question aims at subjecting the video signal IS captured via the module 12 to an analysis of low-level characteristics that comprise at least one characteristic between contrast and skin tones and at generating a corresponding map of regions with low-level characteristics.

In various embodiments, the analysis of low-level characteristics entails at least one between:
   an analysis of the intensity contrast—e.g., component Y of the YUV signal;
   a detection of the skin tones;
   an analysis of the color or chromatic contrasts; and
   an analysis of the directional contrasts.

In various embodiments, it is possible resort to a fast detector of the skin tones (fast skin detector) operating in the region $\{(Y,U,V)|131<V$ and $300-4*V/3<U\}$.

In block 109, the map of the low-level characteristics thus obtained, i.e., the map of the regions that present said characteristics, is filtered (for example, with a logic product or AND function) on the basis of the low-motion map obtained in step 107, for example operating with a mask obtained by applying a threshold on the low-motion map obtained in step 107.

In various embodiments, it is possible to choose a threshold very close to zero, in view of the fact that in certain conditions the filtering value never returns exactly to zero on account of the rounding-off operations.

In step 110 the area of the map resulting from step 109 is calculated; namely, the regions that have both low-level characteristics and a low motion are identified.

In step 110, after determining the area of said regions that have both low-level characteristics and low motion, said area is compared with the total area of the corresponding image/frame.

If the area of said regions that have both low-level characteristics and low motion is greater than a certain threshold value (for example, 1% of the area of the corresponding image/frame), step 110 yields a positive result, and the system evolves directly to step 114, which will be described more fully in what follows.

If, instead, the area of said regions that have both low-level characteristics and low motion is smaller than the threshold value, it is assumed that in the scene reproduced there is not sufficient motion to obtain an "accurate" region, so that if step 110 yields a negative outcome (values of area lower than the threshold value) a face detector is made to intervene.

Considering the fact that the face detector is used in the presence of low or absent motion, the corresponding face maps can be valid for a rather long time interval. In various embodiments, a face map remains valid, in the absence of (appreciable) motion, for example, for 30 frames.

Consequently, in a step 111 it is verified whether a face map has been successfully obtained recently (for example, in one of the last 30 frames). In the case of positive outcome of step 111, in a step 112 said "previous" face map is retrieved and used in step 114 together with the result of step 107. If, instead, step 111 yields a negative outcome (for example, a face map calculated within 30 past frames is not available), in a step 113 a new face map is generated in view of its use in step 114. If the detection function is not successful, it is recalled after a few frames; for example, after three frames a new attempt is made.

In various embodiments, for step 113 a standard face detector, of any known type, may be used, for example set cascaded to a noise detector.

In this regard, it may once again be noted that from step 108 there may be available a map of the skin tones that can be used to simplify the operations performed in step 113, basically to facilitate the search for the regions where faces may be present.

In step 114, the information obtained, on the one hand, through steps 102 and 107 and, on the other hand, through steps 108 and 113, namely, the map of the regions characterized by high motion, and
the map of the low-level characteristics filtered (for example with an AND operation) with the map of the regions with low motion generated in step 107,
are merged together (for example merged with an operation that is substantially equivalent to a logic sum or OR) to generate at output from step 107 a final map of the regions or areas with salient characteristics, i.e., a map that contains high values in the regions considered important or of interest for the human visual system.

The circular symbol in FIG. 2 denotes a sort of "switch" which may select the filtered low level map when available (as coming from the "yes" output branch of block 110); otherwise it may select the face map (from block 112 or 113), and send the selected signal as an input to block 114, where it is added to the High Motion Map.

The resulting map could be directly used to generate the quantization map designed to be used by the encoder 14, for example according to criteria described in what follows.

In this regard it may be noted that the scaling from 1:8 to 1:16, makes it possible to obtain that each individual point of the saliency map corresponds to a coding block (16×16 macroblock), i.e., the number of total points of the saliency map is equivalent to the total number of macroblocks of the image. On the basis of the saliency values, it is then possible to associate the respective quantization parameter QP that will adjust the quality of the individual macroblocks, as described hereinafter. In various embodiments, in the case where an encoder is used with blocks of different size (different from the 16×16 macroblocks), there may in any case be a step for scaling to the appropriate resolution.

In the exemplary embodiment considered herein (which, it is recalled once again, is merely an example) the aforesaid quantization map is instead generated (in a step 120) after one or more further processing steps—not imperative—, designated by the references 115 to 119, have been performed.

For example, step 115 regards an operation in which the map of the salient areas coming from step 114 (a map that, in the exemplary embodiment considered herein, is already in itself scaled by a factor 1:8 with respect to the image of initial intensity) is further scaled to 1:16 in a step 115, for example taking the maximum value of each 2×2 block.

Step 116 regards the possibility of applying spatial filters and morphological operators of various nature designed to render the map more homogeneous, possibly reducing the content of noise and filling possible holes thereof.

Steps 117 and 118 refer to the possibility of applying to the map (after prior possible implementation of steps 115 and 116) a thresholding function. In particular, step 117 regards a first thresholding operation designed to identify the "most important" region. Step 118 regards a further thresholding operation, carried out with a lower threshold to identify a region to be considered second in order of importance. It is possible of course to identify further areas of gradually decreasing importance. This may be carried out with the further thresholding operation or, as schematically represented in FIG. 3 via a "dilate" operation, performed in a step 119 on the result of step 118 so as to generate a third region as extension of the second region.

Block 120 represents the step in which (operating according to criteria in themselves known) to each element of image or frame considered (in various embodiments the operations are carried out on image blocks, for example on macroblocks of 16×16 pixels) a quantization value QP is associated as a function of the region of importance to which it belongs.

A possible criterion is to assign a finer quantization step to the region of higher interest or importance, applying instead a coarser quantization step to the regions considered of lower importance or interest. The fact of varying the quantization parameter QP makes it possible to act on the quality of reproduction and on the bitrate: broadly speaking, the lower the QP the higher the quality but also the higher the bitrate, and, vice versa, the higher the QP the lower the quality and also the bitrate. By varying the QP on the basis of the saliency it is possible to seek to "spend" the higher number of bits to describe better the most interesting regions and, vice versa, to save the bits in the areas of poor interest at the expense of the quality of the latter.

For example, in the case where a scale of regions classified according to their degree of interest is available (steps 117, 118 and 119 of the example considered herein), it may be possible to proceed by assigning to the region of maximum interest, identified in 117, a smaller quantization step (finer quality), assigning to the region identified in 118 a larger quantization step and assigning to the region identified in 119 a still larger quantization step (gradually coarser quality). This solution is compatible with the fact that one or more of the aforesaid quantization steps will be variable, if necessary in an adaptive way. Hence, it will be appreciated that, in various embodiments, the number of regions of saliency can vary (2, 3, 4, . . . ), as likewise the difference between the QP of the various regions can be assigned as desired.

Figure 5:
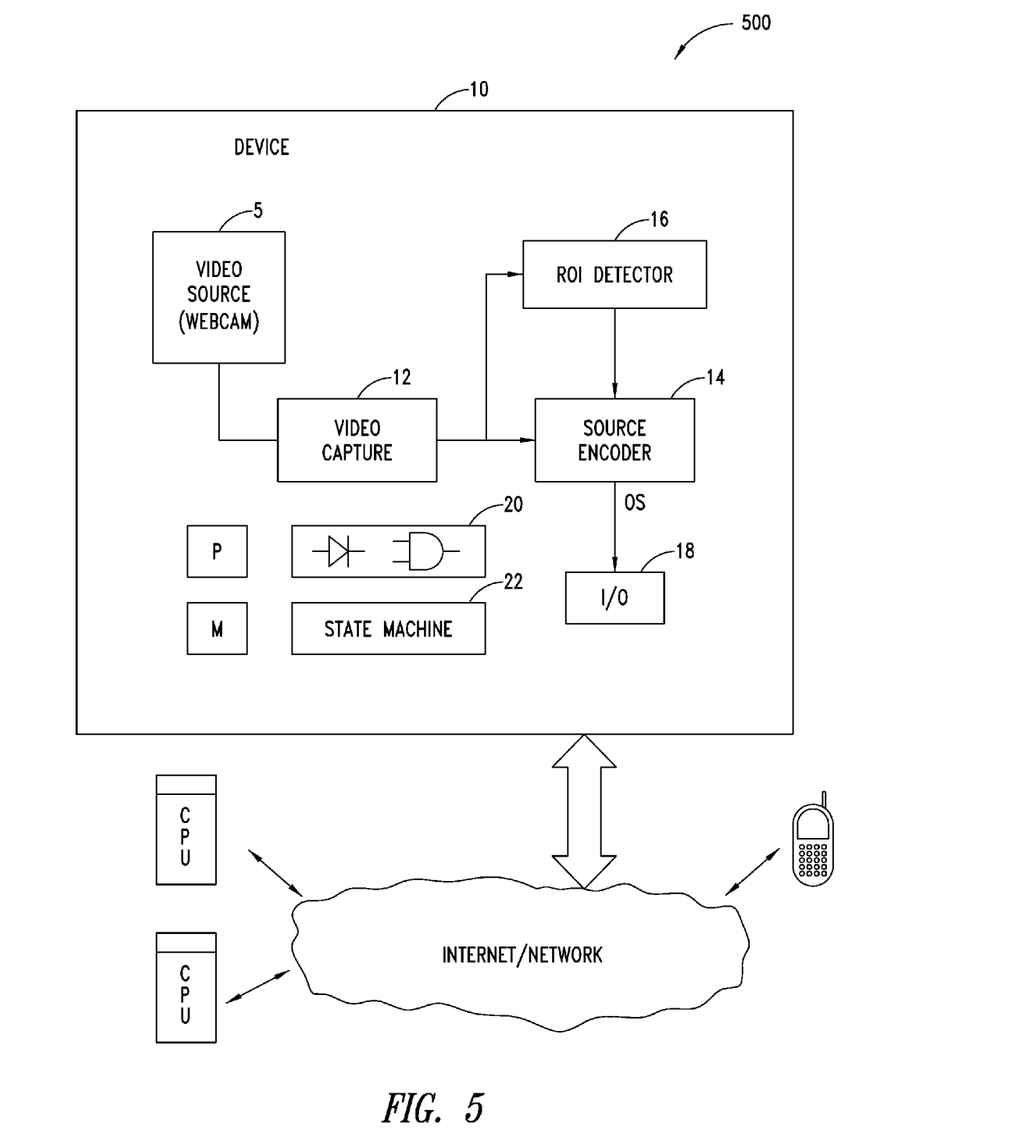
FIG. 5 is a functional block diagram of an embodiment of a system including a region of interest detector.

FIG. 5 illustrates an embodiment of a system 500 comprising a transmitting device 10 such as a computer or cell phone having a video source 5. The device 10 also comprises a video capture module 12, a region of interest (ROI) detector 16 and a source encoder 14, such as the embodiments described above with respect to FIG. 1, as well as an input/output module 18. The device 10 also comprises one or more processors P, one or more memories M, discrete circuitry 20, and a state machine 22. The video source 5, the video capture module 12, the ROI detector 16, the source encoder 14 and the input/output module 18 may be implemented in various ways, such as by the processor P and the memory M (for example by executing instructions stored in the memory M), the discrete circuit 20, the state machine 22, and various combinations thereof, etc. The system 500 also comprises a communication network such as the internet or another network through which the device 10 may communicate with other devices such as the illustrated computing systems and mobile telephone, which as illustrated includes a display. For example, the device 10 may encode a video signal from the video source 5 and transmit the encoded video signal via the communication network.

Figure 6:
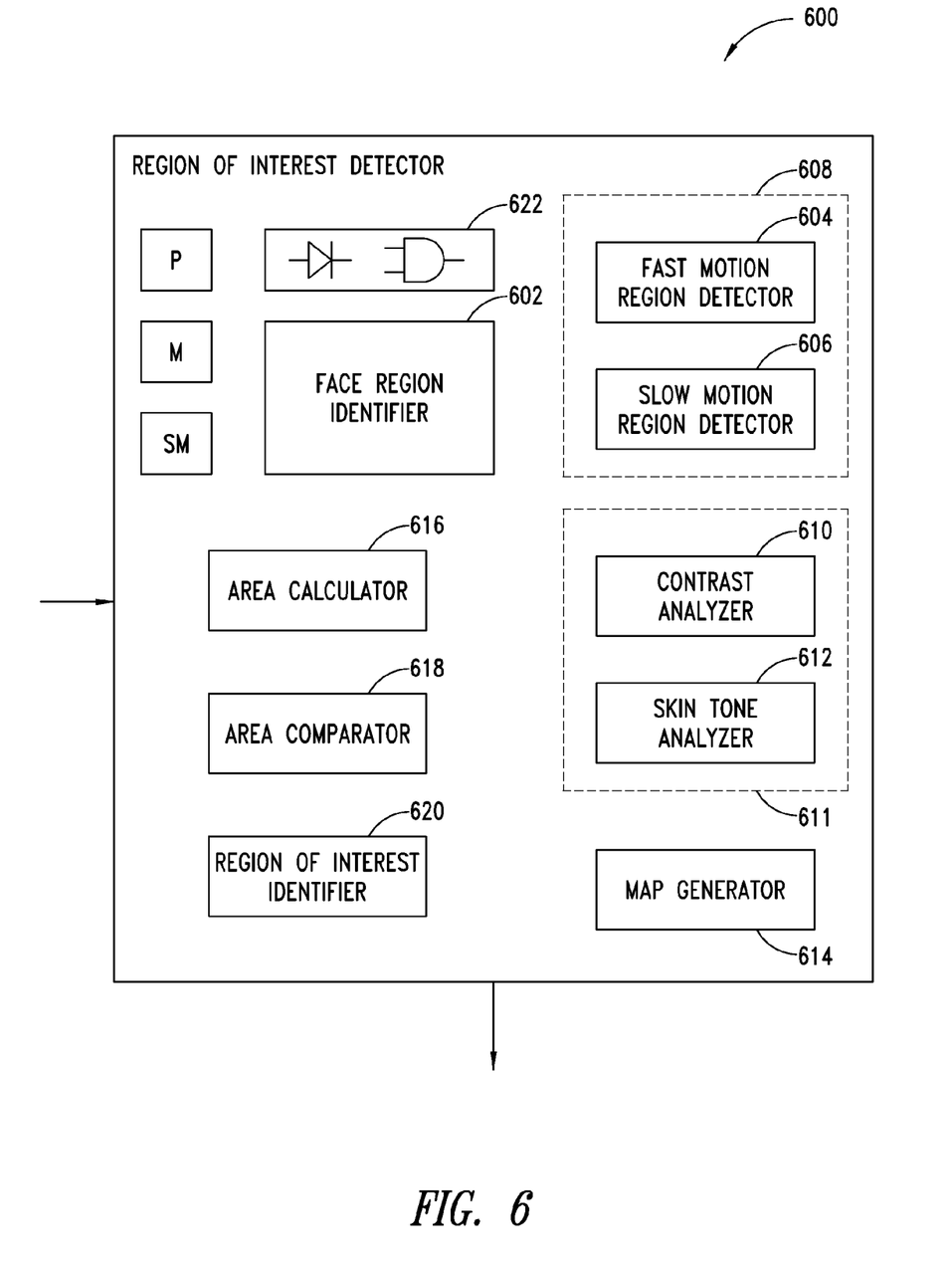
FIG. 6 is a functional block diagram of an embodiment of a region of interest detector.

FIG. 6 illustrates an embodiment of a region of interest detector 16 comprising a face region identifier 602, a fast motion region detector 604, a slow motion region detector 606 (as illustrated, the fast motion region detector 604 and the slow motion region detector 606 may be combined into a region speed detector 608), a contrast analyzer 610, a skin tone analyzer 612, a map generator 614, an area calculator 616, an area comparator 618, and a region of interest identifier block 620. As illustrated, the ROI detector 16 comprises a low-level characteristic region detector 611 comprising the contrast analyzer 610 and the skin tone analyzer 612. The region of interest detector 16 is suitable for use, for example, in embodiments of the device 10 of FIG. 1 and in embodiments of the system 500 of FIG. 5. The region of interest detector 16 also comprises one or more processors P, one or more memories M, discrete circuitry 622, and a state machine SM. The face region identifier 602, fast motion region detector 604, slow motion region detector 606, region speed detector 608, contrast analyzer 610, skin tone analyzer 612, low-level characteristic region detector 611, map generator 614, area calculator 616, area comparator 618, and region of interest identifier block 620 may be implemented in various ways, such as by the processor P and the memory M (for example by executing instructions stored in the memory M), the discrete circuit 622, the state machine SM, and various combinations thereof, etc.

Some embodiments may take the form of computer program products. For example, according to one embodiment there is provided a computer readable medium comprising a computer program adapted to perform one or more of the methods described above. The medium may be a physical storage medium such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the systems and/or modules may be implemented or provided in other manners, such as at least partially in firmware and/or hardware, including, but not limited to, one or more application-specific integrated circuits (ASICs), discrete circuitry, standard integrated circuits, controllers (e.g., by executing appropriate instructions, state machines, and including microcontrollers and/or embedded controllers), field-programmable gate arrays (FPGAs), complex programmable logic devices (CPLDs), etc., as well as devices that employ RFID technology. In some embodiments, some of the modules or controllers separately described herein may be combined, split into further modules and/or split and recombined in various manners.

Of course, without prejudice to the principle of the embodiments discussed herein, the details of implementation and the embodiments may vary, even significantly, with respect to what has been illustrated herein purely by way of non-limiting example, without thereby departing from the scope as defined by the annexed claims.

The various embodiments described above can be combined to provide further embodiments. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    identifying regions of interest in a video signal, by,
    identifying fast motion regions;
    identifying slow motion regions having low-level characteristics;
    comparing an area of the identified slow motion regions having low-level characteristics to a threshold area; and
    when the area of identified slow motion regions having low-level characteristics is smaller than the threshold area,
        identifying face regions; and
        identifying regions of interest as a function of the fast motion regions and the face regions.

2. The method of claim 1 wherein the identifying the slow motion regions having low-level characteristics comprises:
    identifying slow motion regions;
    analyzing at least one of a contrast characteristic and a skin tone characteristic;
    generating a map of low-level characteristic regions based on the analysis of at least one of a contrast characteristic and a skin tone characteristic; and
    filtering said map of low-level characteristic regions as a function of the identified slow motion regions.

3. The method of claim 2 wherein said analyzing at least one of a contrast characteristic and a skin tone characteristic includes at least one of:
    an intensity contrast analysis;
    a skin tone detection;
    a color contrast analysis; and
    a directional contrast analysis.

4. The method of claim 1 including,
    when the area of the identified slow motion regions having low-level characteristics is larger than the threshold area, identifying the regions of interest as a sum of said fast motion regions and the slow motion regions having low level characteristics; and
    when the area of the identified slow motion regions having low-level characteristics is smaller than said threshold area, identifying the regions of interest as a sum of said fast motion regions and the face regions.

5. The method of claim 1 wherein the identifying face regions includes:
    determining whether a previously obtained face map is available;
    when the previously obtained face map is available, retrieving said face map; and
    when the previously obtained face map is unavailable, generating a new face map.

6. The method of claim 1, further comprising ordering at least some of said regions of interest according to saliency order.

7. The method of claim 6 comprising establishing saliency order via thresholding.

8. The method of claim 1 wherein the identifying fast motion regions and the identifying slow motion regions having low-level characteristics includes sub-sampling said video signal.

9. The method of claim 1, further comprising:
encoding the video signal with at least two different quantization step values, by:
applying to the identified regions of interest a quantization step lower than at least one quantization step applied to other regions of said video signal.

10. The method of claim 1 wherein the threshold area is a threshold portion of a total area of the video signal.

11. The method of claim 2 wherein the identifying fast motion regions and the identifying slow motion regions having low-level characteristics includes at least one of:
thresholding said video signal with respect to an average intensity value;
identifying contours of regions in motion by discarding those regions having a perimeter lower than a threshold perimeter; and
identifying contours of regions in motion by merging adjacent regions.

12. A non-transitory computer-readable medium containing contents that cause a processing device to perform a method, the method comprising:
identifying regions of interest in a video signal, by,
identifying fast motion regions;
identifying slow motion regions having low-level characteristics;
comparing an area of the identified slow motion regions having low-level characteristics to a threshold area;
when the area of the identified slow motion regions having low-level characteristics is larger than the threshold area, identifying regions of interest as a function of the fast motion regions and the slow motion regions having low-level characteristics; and
when the area of identified slow motion regions having low-level characteristics is smaller than the threshold area,
identifying face regions; and
identifying regions of interest as a function of the fast motion regions and the face regions.

13. The non-transitory computer-readable medium of claim 12 wherein the identifying the slow motion regions having low-level characteristics comprises:
identifying slow motion regions;
analyzing at least one of a contrast characteristic and a skin tone characteristic;
generating a map of low-level characteristic regions based on the analysis of at least one of a contrast characteristic and a skin tone characteristic; and
filtering said map of low-level characteristic regions as a function of the identified slow motion regions.

14. The non-transitory computer-readable medium of claim 12 wherein the method includes,
when the area of the identified slow motion regions having low-level characteristics is larger than the threshold area, identifying the regions of interest as a sum of said fast motion regions and the slow motion regions having low level characteristics; and
when the area of the identified slow motion regions having low-level characteristics is smaller than said threshold area, identifying the regions of interest as a sum of said fast motion regions and the face regions.

15. The non-transitory computer-readable medium of claim 12, the method further comprising ordering at least some of said regions of interest according to saliency order.

16. The non-transitory computer-readable medium of claim 12 wherein the identifying fast motion regions and the identifying slow motion regions having low-level characteristics includes at least one of:
thresholding said video signal with respect to an average intensity value;
identifying contours of regions in motion by discarding those regions having a perimeter lower than a threshold perimeter; and
identifying contours of regions in motion by merging adjacent regions.

17. A device, comprising:
a face region identifier configured to identify face regions in a video signal;
a motion region detector configured to identify fast motion regions and slow motion regions in the video signal;
a low-level characteristics region identifier configured to identify regions with low-level characteristics based on at least one of a contrast analysis and a skin tone analysis;
an area calculator configured to determine an area of slow motion regions having low-level characteristics;
a comparator configured to compare the determined area to a threshold area; and
a region of interest identifier configured to:
when the determined area is larger than the threshold area, identify a set of regions of interest as a function of identified fast motion regions and identified slow motion regions having low level characteristics; and
when the determined area is smaller than the threshold area, identify the set of regions of interest as a function of identified fast motion regions and identified face regions.

18. The device of claim 17 wherein the region of interest identifier is configured to,
when the determined area is larger than the threshold area, identifying the set of regions of interest as a sum of identified fast motion regions and identified slow motion regions having low level characteristics; and
when the area is smaller than said threshold area, identifying the set of regions of interest as a sum of identified fast motion regions and identified face regions.

19. The device of claim 17 wherein the low-level characteristics region identifier comprises at least one of:
an intensity contrast analyzer;
a skin tone analyzer;
a color contrast analyzer; and
a directional contrast analyzer.

20. The device of claim 17 wherein said face region identifier is configured to:
determine whether a face map is available;
when it is determined a face map is available, retrieve the face map; and
when it is determined a face map is unavailable, generate a face map.

21. The device of claim 17 wherein the region of interest identifier is configured to order the identified set of regions of interest according to saliency order.

22. The device of claim 17, further comprising:
an encoder configured to encode the video signal with at least two different quantization step values, by:
applying to the identified set of regions of interest a quantization step lower than at least one quantization step applied to other regions of said video signal.

23. The device of claim 22, further comprising a video signal source.

24. A system, comprising:
means for identifying fast motion regions;
means for identifying slow motion regions having low-level characteristics;

means for identifying face regions; and means for identifying regions of interest in a video signal based on an area of identified slow motions having low-level characteristics, wherein the means for identifying regions of interest is configured to, when the area of identified slow motion regions having low-level characteristics is larger than a threshold area, identifying said regions of interest as a function of identified fast motion regions and identified slow motion regions having low-level characteristics; and when the area of identified slow motion regions having low-level characteristics is smaller than the threshold area, and identifying said regions of interest as a function of identified fast motion regions and identified face regions.

25. The system of claim 24 wherein the means for identifying regions of interest is configured to, when the area of identified slow motion regions having low-level characteristics is larger than the threshold area, identifying said regions of interest as a sum of identified fast motion regions and identified slow motion regions having low-level characteristics; and when the area of identified slow motion regions having low-level characteristics is smaller than the threshold area, and identifying said regions of interest as a sum of identified fast motion regions and identified face regions.

* * * * *

UNITED STATES PATENT AND TRADEMARK OFFICE
CERTIFICATE OF CORRECTION

| | | |
|---|---|---|
| PATENT NO. | : 9,619,887 B2 | Page 1 of 1 |
| APPLICATION NO. | : 13/235099 | |
| DATED | : April 11, 2017 | |
| INVENTOR(S) | : Tea Anselmo et al. | |

It is certified that error appears in the above-identified patent and that said Letters Patent is hereby corrected as shown below:

In the Claims

Column 19, Line 3:
"based on an area of identified slow motions having"
Should read:
--based on an area of identified slow motion regions having--.

Signed and Sealed this
Seventh Day of November, 2017

Joseph Matal
*Performing the Functions and Duties of the
Under Secretary of Commerce for Intellectual Property and
Director of the United States Patent and Trademark Office*